US010430810B2

(12) United States Patent
Niedziela et al.

(10) Patent No.: US 10,430,810 B2
(45) Date of Patent: Oct. 1, 2019

(54) SYSTEMS AND METHODS FOR ASSESSING THE MARKETABILITY OF A PRODUCT

(71) Applicant: Health Care Direct, Inc., Flemington, NJ (US)

(72) Inventors: Michelle Murphy Niedziela, Chalfont, PA (US); Matthew Reid Rosazza, Bensalem, PA (US)

(73) Assignee: Health Care Direct, Inc., Flemington, NJ (US)

( * ) Notice: Subject to any disclaimer, the term of this patent is extended or adjusted under 35 U.S.C. 154(b) by 278 days.

(21) Appl. No.: 15/272,232

(22) Filed: Sep. 21, 2016

(65) Prior Publication Data

US 2017/0083927 A1  Mar. 23, 2017

Related U.S. Application Data

(60) Provisional application No. 62/222,060, filed on Sep. 22, 2015, provisional application No. 62/352,274, filed on Jun. 20, 2016.

(51) Int. Cl.
*G06Q 30/02* (2012.01)
*G06T 19/20* (2011.01)

(52) U.S. Cl.
CPC ......... *G06Q 30/0201* (2013.01); *G06T 19/20* (2013.01)

(58) Field of Classification Search
CPC ............ G06Q 10/00–99/00; G06T 1/00–19/20
USPC ............................................. 705/7.11–7.42
See application file for complete search history.

(56) References Cited

U.S. PATENT DOCUMENTS

| 5,676,138 | A | 10/1997 | Zawilinski |
| 6,190,314 | B1 | 2/2001 | Ark et al. |
| 6,292,688 | B1 | 9/2001 | Patton |
| 6,453,194 | B1 | 9/2002 | Hill |
| 6,584,346 | B2 | 6/2003 | Flugger |
| 8,700,009 | B2 | 4/2014 | Quy et al. |
| 2003/0032891 | A1 | 2/2003 | Hazlett et al. |
| 2004/0117212 | A1* | 6/2004 | Kong ............ A61B 5/0205 705/2 |
| 2008/0043025 | A1 | 2/2008 | Afriat et al. |
| 2008/0065468 | A1 | 3/2008 | Harrington et al. |

(Continued)

FOREIGN PATENT DOCUMENTS

WO  2011045422 A1  4/2011

OTHER PUBLICATIONS

Warrenburg, S. (2005). Effects of Fragrance on Emotions: Moods and Physiology. Chem. Senses, 30, 248-249.*

(Continued)

*Primary Examiner* — Alan S Miller
*Assistant Examiner* — Jay-Ming Wang
(74) *Attorney, Agent, or Firm* — Rita C. Chipperson; Chipperson Law Group, P.C.

(57) ABSTRACT

Embodiments of the present invention generally relate to systems and methods for psycho-physiological mood mapping. More specifically, the present invention relates to systems and methods for monitoring various parameters such as, but not limited to, facial muscle activity, heart rate changes, skin conductance changes, electrical charges across scalp, eye tracking, and behavior analysis and analyzing the data of such parameters via a 3D mood map. This data analysis may be used for many purposes including, without limitation, assessing the marketability of a product.

9 Claims, 9 Drawing Sheets

(56) References Cited

U.S. PATENT DOCUMENTS

| | | | |
|---|---|---|---|
| 2008/0208016 A1* | 8/2008 | Hughes | A61B 5/0533 600/301 |
| 2008/0214903 A1 | 9/2008 | Orbach | |
| 2008/0292151 A1* | 11/2008 | Kurtz | A61B 3/10 382/128 |
| 2009/0156887 A1 | 6/2009 | Hsu | |
| 2010/0185564 A1 | 7/2010 | King et al. | |
| 2012/0179536 A1* | 7/2012 | Kalb | G06Q 30/02 705/14.43 |
| 2012/0259240 A1 | 10/2012 | Llewellynn et al. | |
| 2013/0097176 A1* | 4/2013 | Khader | G06Q 30/0251 707/748 |
| 2015/0025403 A1 | 1/2015 | Chang et al. | |
| 2015/0032642 A1* | 1/2015 | Blackhurst | G06Q 10/20 705/305 |

OTHER PUBLICATIONS

Warrenburg, S. (2005). Effects of Fragrance on Emotions: Moods and Physiology. Chem. Senses, 30, 248-249. (Year: 2005).*

Bradley, Margaret M., and Lang, Peter J., Measuring Emotion: The Self-Assessment Manikin and The Semantic Differential. J. Behav. Ther. & Exp. Psychiatry, vol. 25, No. 1, pp. 49-59, 1994.

Dan-Glauser, Elise S., and Scherer, Klaus R., The Geneva affective picture database (GAPED): a new 730-picture database focusing on valence and normative significance, Behavior Research Methods, vol. 43, No. 2, pp. 468-477, 2011.

Mehrabian, Albert, and Russell, James A., The Basic Emotional Impact of Environments, Perceptual and Motor Skills, vol. 38, No. 1, pp. 283-301, 1974.

Watson, David, Clark, Lee Anna, and Tellegen, Auke, Development and and Validation of Brief Measure of Positive and Negative Affect: The PANAS Scales, Journal of Personality and Social Psychology, vol. 54, No. 6, pp. 1063-1070, 1988.

Niedziela, Michelle Murphy, Applications of Psycho-physiological Measures in Holistic Consumer Decisions, HCD Research, Slides 14-19, 2014.

Ollander, Simon, Wearable Sensor Data Fusion for Human Stress Estimation, Linkoping University, p. 9 and p. 67, 2015.

* cited by examiner

FIG. 6

SYSTEMS AND METHODS FOR ASSESSING THE MARKETABILITY OF A PRODUCT

BACKGROUND OF THE INVENTION

Embodiments of the present invention generally relate to systems and methods for assessing the market readiness of a product. More specifically, the present invention relates to systems and methods for assessing the market readiness of a product via psycho-physiological mood mapping.

In the field of applied consumer neuroscience, it has been determined that people see, interpret and behave in the world via four (4) general steps: forming impressions; determining meaning and value; deliberating and analyzing; and speaking and acting. That is, as we interact with the world around us, we non-consciously take in information. As we find meaning and importance in these inputs, we become consciously aware of them, deciding how we will react.

Products are experienced via sensory systems of sight, smell, taste, touch and sound (i.e., five (5) dimensionally). Each is an opportunity for the product to communicate with the consumer. This experience forms impressions in the brain that affect mood and arousal levels while setting a context for the product. By helping product developers to understand the consumer experience through the senses, we help them uncover new opportunities for product innovation.

Background information for measuring emotion may be found in the following:

Bradley & Lang (1994). Measuring emotion: the Self-Assessment Manikin and the Semantic Differential. J Behav Ther Exp Psychiatry, 25(1):49-59;

Dan-Glauser, E. S., & Scherer, K. R. (2011). The Geneva affective picture database (GAPED): a new 730-picture database focusing on valence and normative significance, Behavior Research Methods, 43(2), 468-477; and Mehrabian & Russell (1974). The basic emotional impact of environments. Percept Mot Skills, 38(1):283-301.

The Positive and Negative Affect Schedule (PANAS) developed by Watson, Clark, and Tellegen (1988b).

BRIEF SUMMARY OF THE INVENTION

Briefly stated, in one aspect of the present invention, a system for assessing the market readiness of a product is provided. This system includes a computing device including a non-transitory computer readable medium for gathering and assessing various data, comprising instructions stored thereon, which when executed by a processor read data inputs related to one or more of the following: facial muscle activity, heart rate changes, skin conductance changes, electrical charges across scalp, eye tracking, and behavior analysis. This data may be utilized for psycho-physiological mood mapping.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 6 depicts a table of exemplary data collected via the exemplary system 100 of FIG. 1;

DETAILED DESCRIPTION OF THE INVENTION

Figure 1:
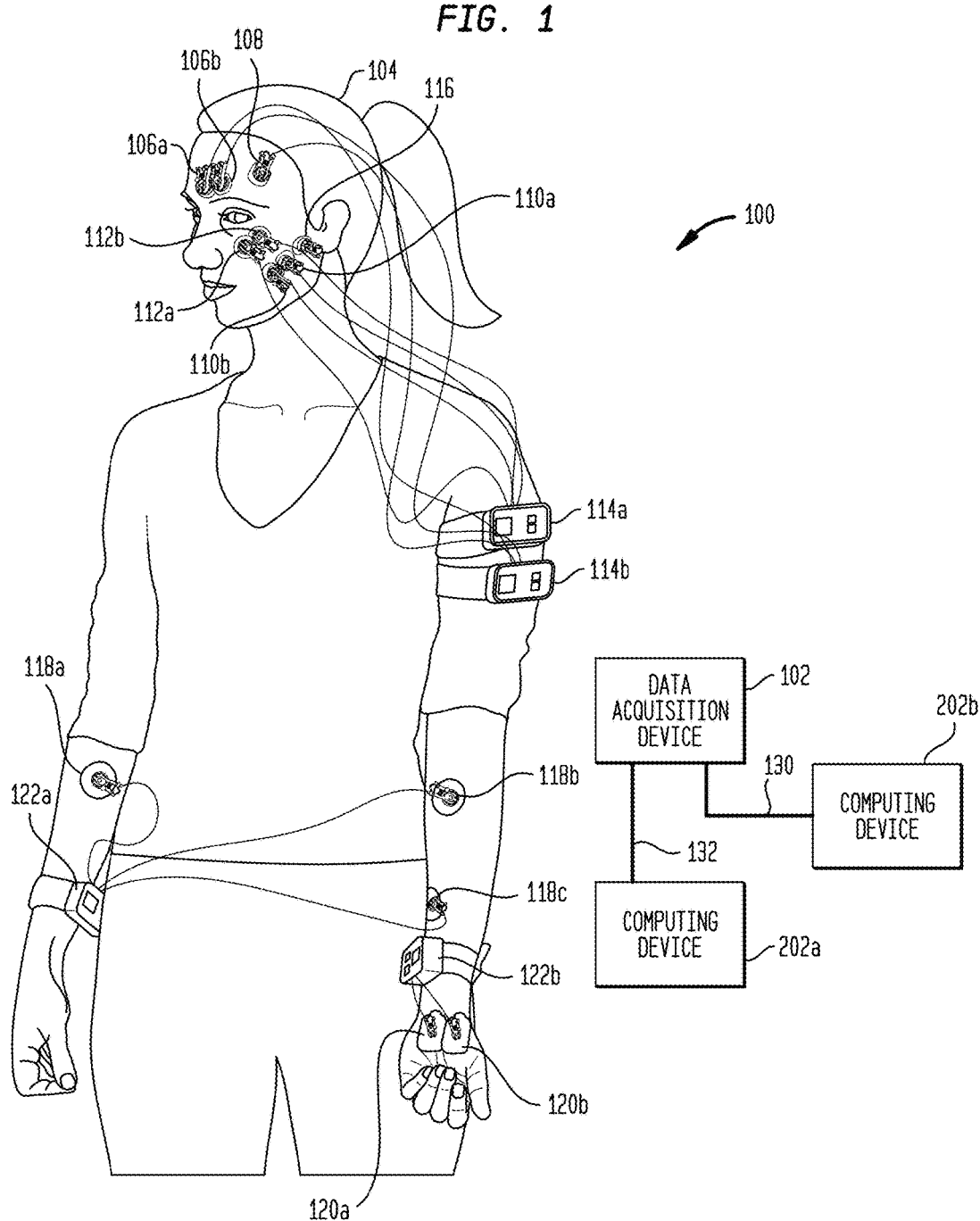
FIG. 1 depicts one system for assessing the marketability of a product in accordance with one embodiment of the present invention.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Furthermore, the subject application references certain processes which are presented as series of ordered steps. It should be understood that the steps described with respect to those processes are not to be understood as enumerated consecutive lists but could be performed in various orders while still embodying the invention described herein.

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a sensor" may include a plurality of sensors. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Disclosed herein are systems and methods for assessing the market readiness of a product. As used herein, "product" is not limited to a physical product but can also include, for example, services, experiences, and the like. These systems and methods may include assessing whether revisions are required for such product and suggesting which aspects of the product require revision. In some embodiments of the invention, the systems and methods utilize psycho-physiological mood mapping.

In one embodiment of the present invention, three psycho-physiological measures, namely, facial electromyography ("fEMG"), heart rate variability ("HRV"), and galvanic skin response ("GSR") are monitored and the results are mapped as vectors to create a three-dimensional mood map, as such measures reflect emotional valance, motivation (or dominance or approach/withdrawal or attention to or from a stimulus), and arousal (e.g., arousal experienced in response to a stimulus), respectively. However, such measures may also be obtained in other manners including, without limitation, via survey (e.g., using the Self Assessment Manakin ("SAM") by Bradley & Lang 1994). The theory behind the psycho-physiological mood map is based in part on the Pleasure-Arousal-Dominance ("PAD") Theory of Emotion as outlined by Mehrabian and Russell (1974). The basic emotional impact of environments. Percept Mot Skills, 38(1):283-301.

However, more or less measures may be monitored and/or recorded including, without limitation, electroencephalogram ("EEG") measurement of electrical charges across the scalp which may correlate to motivation, eye tracking which may correlate to visual attention, and behavior analysis such as facial, routines, facial muscle activity, heart rate changes, skin conductance changes, etc.

fEMG refers to an electromyography technique that measures muscle activity by detecting and amplifying the tiny electrical impulses that are generated by muscle fibers when they contract. It primarily focuses on two major muscle groups in the face, the corrugators supercilii group which is associated with frowning and the zygomaticus major muscle group which is associated with smiling. In some aspects, orbicularis oculi may also be monitored for muscle activity. In one aspect of the present invention, fEMG is used to measure emotional valence experienced in response to a stimulus (e.g., pleasure), however, alternate systems and/or methods of measuring pleasure may be substituted without departing from the scope hereof.

HRV refers to the physiological phenomenon of variation in the time between heartbeats. It is measured by the variation in the beat-to-beat interval. In one aspect of the present invention, HRV is used to measure dominance, however, alternate systems and/or methods of measuring dominance (or approach/withdrawal) may be substituted without departing from the scope hereof.

GSR refers to the property of the human body that causes continuous variation in the electrical characteristics of the skin (e.g., changes in electrical conductance across the skin), which is also sometimes referred to as electrodermal activity ("EDA"). The relationship between emotional arousal and sympathetic activity and these autonomic sympathetic changes alter sweat and blood flow, which in turn affects GSR. In one aspect of the present invention, GSR is used to measure arousal in response to a stimulus, however, alternate systems and/or methods of measuring arousal may be substituted without departing from the scope hereof.

EEG refers to a non-invasive method to record electrical activity of the brain along the scalp. EEG measures voltage fluctuations resulting from ionic current within the neurons of the brain. In some aspects of the present invention, EEG is used to measure pleasure and/or dominance, however, alternate systems and/or methods of measuring pleasure and/or dominance may be substituted without departing from the scope hereof.

Eye tracking is the process of measuring either the point of the gaze (where one is looking) or the motion of the head. An eye tracker device is utilized to measure eye positions and movement. In some embodiments of the present invention, eye tracking is utilized to determine the time at which an emotional occurrence occurs, for example, if such emotional occurrence occurs in response to a particular behavior or visual stimulus.

Figure 7:
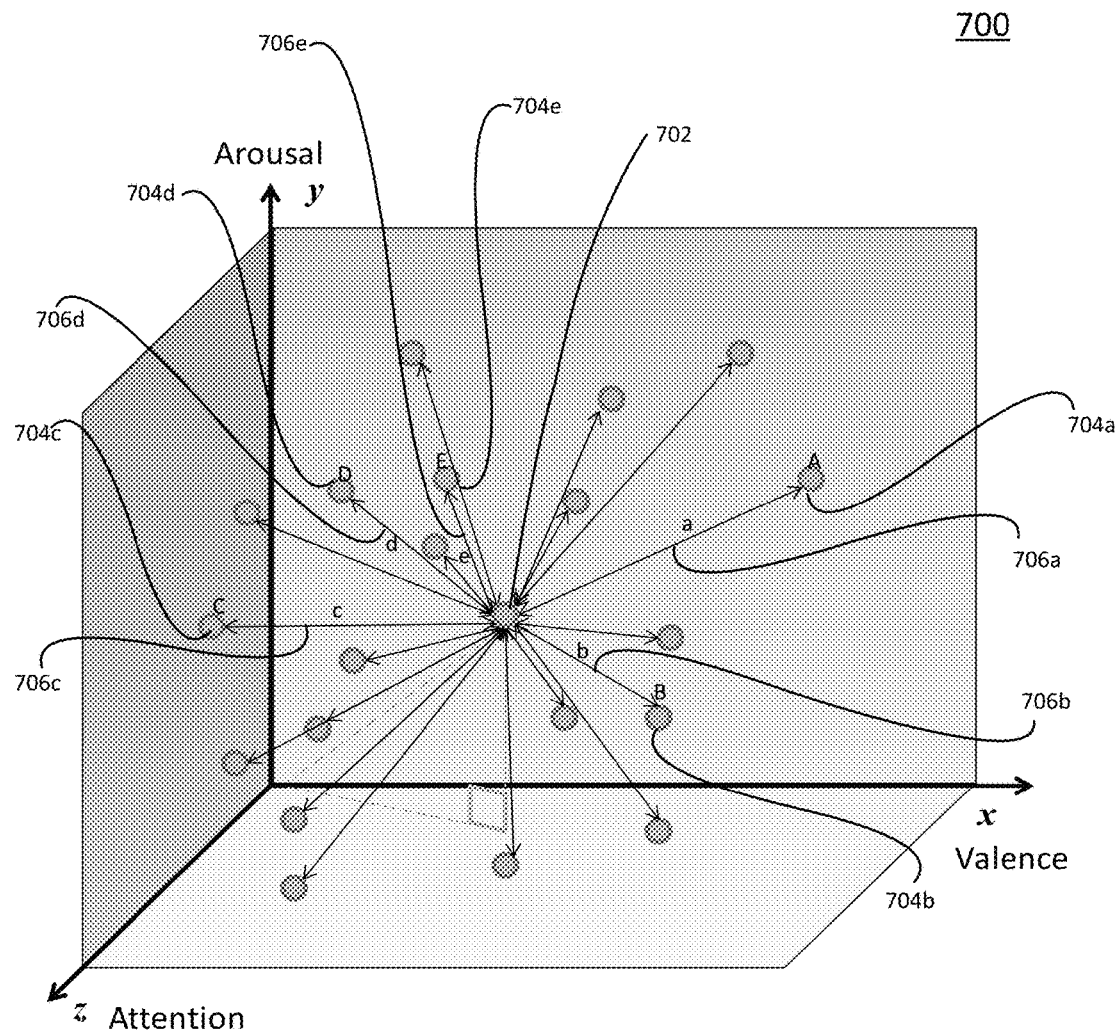
FIG. 7 depicts an exemplary three-dimensional mood map prior to mapping of subject and benchmark data points in accordance with one embodiment of the invention.

In some embodiments of the present invention, the systems and methods for creating a psycho-physiological mood map includes an algorithm for calculating a three-dimensional ("3D") space on a mood map based on the weighted psycho-physiological measures. An example of one such mood map is depicted in FIGS. 4, 7, and 8B.

Figure 4:
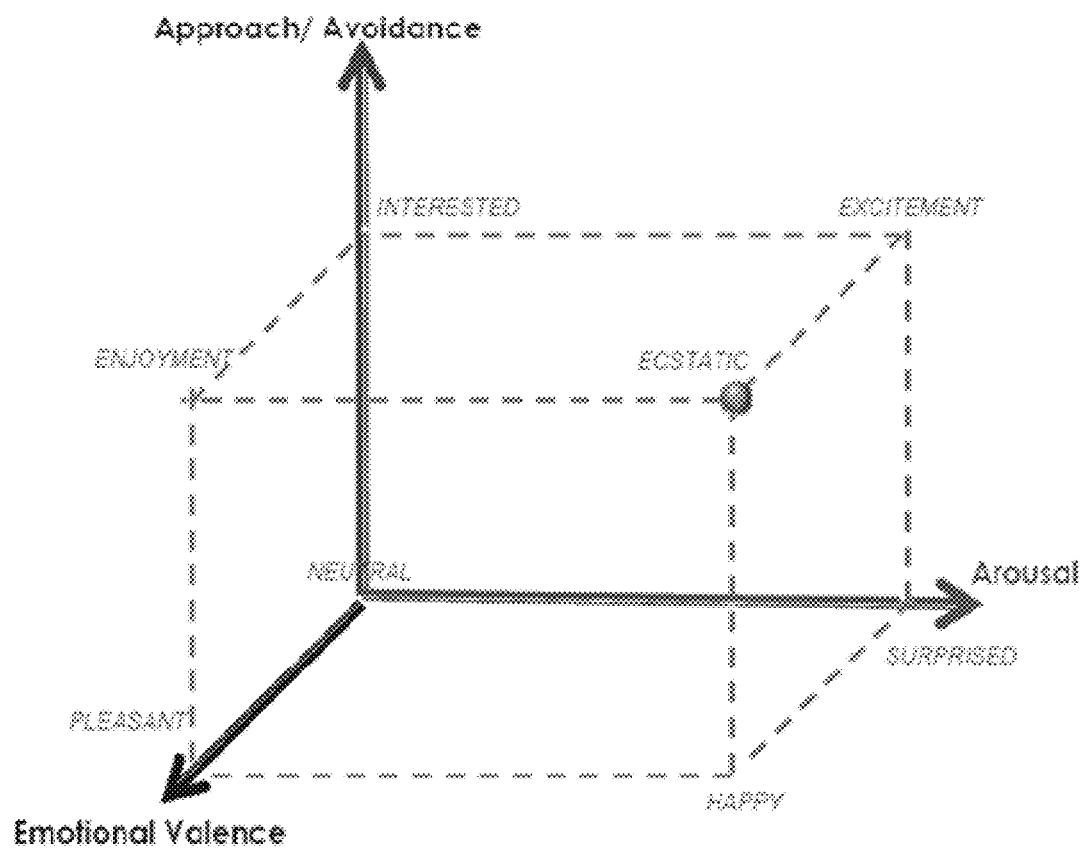
FIG. 4 depicts an exemplary three-dimensional mood map depicting arousal vs. pleasantness vs. approach/avoidance.

Referring now to FIG. 4, depicted is an exemplary 3D mood map. The depicted map displays measures of a moment, i.e., a position vector in a 3D space indicating a discrete emotional experience.

Figure 8A:
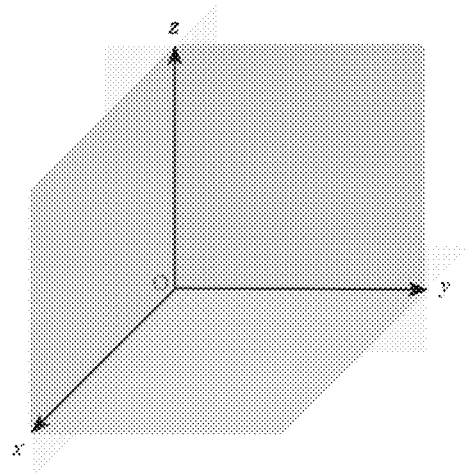
FIG. 8A depicts an exemplary x-y-z map prior to mapping of an emotional point in accordance with one embodiment of the invention.

Referring now to FIG. 8A, depicted is an exemplary x-y-z map prior to the mapping of an emotional point in accordance with one embodiment of the present invention. The x-y-z map includes three planes: the x-y plane located between the x and y axes; the x-z plane located between the x and z axes; and the y-z plane located between the y and z axes. The x-y plane may also be described using the equation z=0 since all points on that plane will have a value of zero for its z-value. This area is the 2d emotional space. Similarly, the x-z plane may be described using the equation y=0 since all points on that plane will have a value of zero for its y value. Similarly, the y-z plane may be described using the equation x=0 since all points on that plane will have a value of zero for its x value.

Figure 8B:
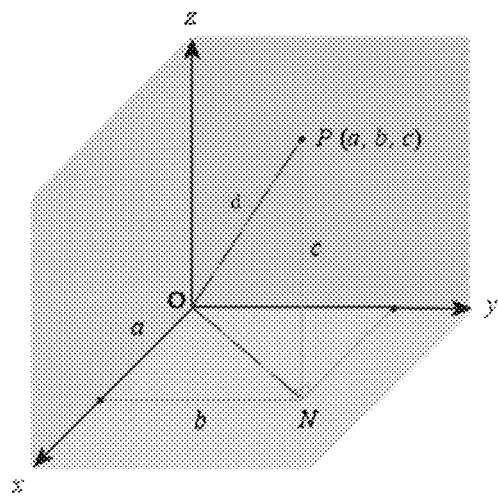
FIG. 8B depicts an exemplary mood map including a mapped emotional point in accordance with one embodiment of the invention.

Turning next to FIG. 8B, depicted is an exemplary mood map including a mapped emotional point P (a, b, c). The 2d emotional point N is located directly below P on the x-y plane. Where P is the discrete mapped emotional 3D point, a represents emotional valence, b represents arousal, and c represents motivation. Units measured from point 0 are termed emotional units for each plane, and these units are calculated by calculating standard deviations in change scores from baseline physiological measures.

The distance from (0,0,0), or neutral emotion, to the point P (a, b, c) is determined by the following equation: distance $OP=\sqrt{a^2+b^2+c^2}$. This distance is the emotional moment arm, or effect moment indicating the strength of the emotional experience calculated in response to a stimulus as measured in physiological emotional units.

Since emotions are not discrete emotional points, but rather take up a 3D space, any measured discrete point is defined by the emotional space in which it lies. Emotional spaces are defined by measuring reactions to pre-defined and validated emotional imagery (validated using other validated measures such as calculations validated with SAM and images pre-emotionally defined by GAPED.

Figure 9A:
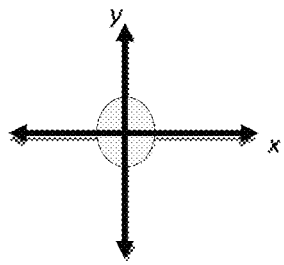
FIG. 9A is a graphical representation of a neutral emotion in accordance with one embodiment of the invention.

Examples of emotional spaces in accordance with one embodiment of the invention are shown in FIGS. 9A though 9E. FIGS. 9A through 9E depict neutral emotions, negative-aroused (anger, fear), negative-calm (bored-sad), positive-aroused (glad, happy, joy), and positive-calm (relaxed, content), respectively. That is, as shown in FIG. 9A, neutral emotion occurs within the area of 1 standard deviation around (0,0,0). This point is also considered an emotional baseline.

Figure 9C:
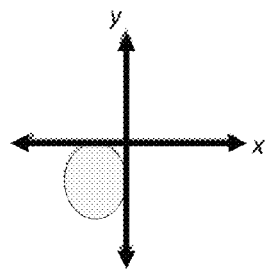
FIG. 9C is a graphical representation of a negative-calm emotion in accordance with one embodiment of the invention.
Figure 9B:
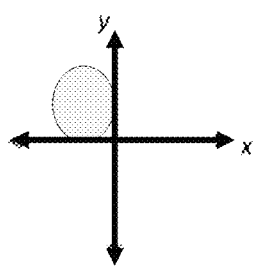
FIG. 9B is a graphical representation of a negative-aroused emotion in accordance with one embodiment of the invention.

As shown in FIG. 9B, negative-aroused emotions such as anger and fear occur within the negative valence and positive arousal quadrant. Anger is defined as positive z within this space, and fear is defined as negative z within this space.

As depicted in FIG. 9C, negative-calm emotions such as sad and bored occur within the negative valence and negative arousal quadrant. Sad is defined as positive z within this space, and bored is defined as negative z within this space.

Figure 9D:
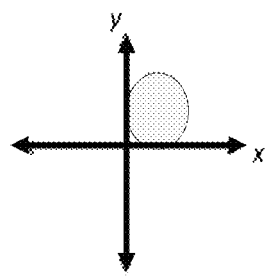
FIG. 9D is a graphical representation of a positive-aroused emotion in accordance with one embodiment of the invention.

As shown in FIG. 9D, positive-aroused emotions such as glad, happy and joy occur within the positive valence and positive arousal quadrant. Glad is defined as negative z within this space, happy is defined as a neutral z within this space, and joy is defined as positive z within this space.

Figure 9E:
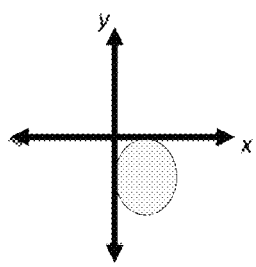
FIG. 9E is a graphical representation of a positive-calm emotion in accordance with one embodiment of the invention.

Similarly, as shown in FIG. 9E, positive-calm emotions such as relaxed and content occur within the positive valence and negative arousal quadrant. Relaxed is defined as negative z within this space, and content is defined as positive z within this space The mood maps created herein may then be applied for assessing consumer emotion response to products and product attributes. For example, by tracking physiological changes after exposure to a product or product attribute and then mapping those changes to an emotional response, the systems and methods of the present invention are able to visualize or assess unconscious emotional consumer responses and reactions to a product.

In cases in which three measures (e.g., arousal, valence, and motivation) need to be reduced to a single piece of data for the sake of simplicity, geometric formulas are applied to find the exact distance from a zero point (as depicted in FIG. 8B) to the measured point in the 3D space. This may be done by using the distance formula:

$$d=\sqrt{(x_2-x_1)^2+(y_2-y_1)^2}$$

Since SAM measures range on the integers 1 through 9, this approach may be easily applied to the SAM information. First we calculate the distance from the max point to zero using a formula such as:

$$d_{max\ to\ zero}=\sqrt{(x_{max}-0)^2+(y_{max}-0)^2}=\sqrt{(9-0)^2+(9-0)^2}\approx12.73.$$

In this case, the variables $x_m$ and $y_{max}$ are the maximum possible values of 9 and 9.

Then, to find the distance from the max point to the measured point, the following formula may be used:

$$d_{max\ to\ measured}=\sqrt{(x_{max}-x_{measured})^2+(y_{max}-y_{measured})^2};$$

wherein the variables $x_{measured}$ and $y_{measured}$ are the measured values for valence and arousal (e.g., a and b as discussed above and as depicted in FIG. 8B).

Finally, we can subtract $d_{max\ to\ measured}$ from $d_{max\ to\ zero}$ to get $d_{measured\ to\ zero}$:

$$d_{measured\ to\ zero}=\sqrt{(x_{max}-0)^2+(y_{max}-0)^2}-\sqrt{(x_{max}-x_{measured})^2+(y_{max}-y_{measured})^2}$$

or $$d_{measured\ to\ zero}=12.73-\sqrt{(9-x_{measured})^2+(9-y_{measured})^2}.$$

This gives us a collapsed representation of two dimensions as a single value. To generate a collapsed representation of a 3$^{rd}$ dimension, the process is repeated. This time, the distance that has just been calculated is treated as the x value with a maximum range value of 12.73 instead of 9. The y value comes from the measured value for motivation (e.g., variable c as mentioned above and as depicted in FIG. 7B), which continues to have the maximum range of 9.

$$d_{max\ to\ zero}=\sqrt{(x_{max}-0)^2+(y_{max}-0)^2}=\sqrt{(12.73-0)^2+(9-0)^2}\approx15.59,$$

which provides the following final formula:

$$d_{measured\ to\ zero}=15.59-\sqrt{(12.73-x_{measured})^2+(9-y_{measured})^2}$$

Now the value of $d_{measured\ to\ zero}$ represents the absolute value of the measured data point's distance from zero.

This same approach may be applied to biometric data. Instead of using nine as a maximum and zero as a minimum, the range is defined by the maximum and minimum recorded by the electrophysiological equipment. Although not as clear cut as the SAM calculation, it offers the same ability to simplify in order to make sense of complex data. The following steps may be taken to determine physiological responses to affective norms. First, as step 1, images are selected from a database with pre-scored affective ratings. One such suitable database is the GAPED, which can be found at) http://www.affective-sciences.org/researchmaterial). These images are chosen to represent a wide range of emotional content. They are prepared using stimulus presentation software such as e-Prime software as manufactured by Psychology Software Tools, Inc. ("e-Prime") to allow the stimuli to be shown to testing subjects who meet certain required criteria. Such stimulus presentation software is typically capable of showing a variety of types of stimuli including, without limitation, images and videos. Physiological data (e.g., fEMG, EDA, and EKG) is then measured for the subjects being present with the stimuli utilizing data measuring equipment as manufactured by Biopac Systems, Inc. ("Biopac").

Second, as step 2, responses to the images shown are gathered from subjects via survey software pertaining to categorical descriptions of emotion based on a Positive and Negative Affective Schedule such as the one found at http://www.enbc.pt/jpmatos/28.Watson.pdf. Then, the results are prepared in a spreadsheet or other format (using, for example, Microsoft Excel) in order to facilitate comparison of physiological response and categorical response. Each categorical item is then calculated to have three (3) coordinate values in space based on the three (3) physiological measures. In the depicted embodiment, these coordinate values are the change from baseline for the physiological measures, namely, the x coordinate is the change from baseline for HRV, the y value is the change from baseline for GSR, and the z value is the change from baseline for fEMG. In this manner, affective norms as represented in a conceptual 3D space are calculated.

Third, as step 3, a relation of normative coordinates to new measured data is determined. To do this, normative affective coordinates (i.e., the area in 3D space in which categorical descriptions of emotion exist) are plotted via graphing software. A new stimulus is presented to subjects, and the three (3) aspects of physiological data are acquired again from the subjects using, for example, Biopac equipment and Acqknowledge software. The coordinates of the response to the new stimulus are mapped within the 3D space, and their relative distances to pre-existing categorical norms are determined. The distance between the norms and the new measured stimulus are used to apply a categorical affective label to the new measured stimulus.

After steps 1 and 2 are performed a single time, a basis for the affective norms is established. These steps can be repeated to provide more emotional landmarks for the affective norms if desired. Step 3 is repeated for each product for which market readiness is being tested for a particular product. Step 3 applies the mood map established in steps 1 and 2 to the data generated by exposure of the subjects to the product or product stimuli being tested in order to determine whether the emotional goals of the product are being met.

In another aspect of the present invention, the results will be validated by correlating the physiological measures to validated SAM measures of documented and emotionally assessed imagery for use in commercial consumer research. See Bradley M M, Lang P J (1994). Measuring emotion: the Self-Assessment Manikin and the Semantic Differential. J Behav Ther Exp Psychiatry, 25(1):49-59.

In one embodiment of the present invention, "engagement" is calculated using arousal (GSR) and emotional valence (fEMG) measurements. For example, in one embodiment of the present invention, engagement is calculated as follows:

$$\text{Engagement} = \sqrt{(\Delta \text{Arousal}^2 + \Delta \text{Emotion}^2)}$$

The calculated engagement can then be utilized in conjunction with the Dominance measure to determine a biometrics score as follows:

$$\text{Biometrics Score} = \sqrt{(\text{Engage}^2 + \text{Dominance}^2)}$$

In the above exemplary embodiment, more weight is placed on the arousal and emotional valence measurements, however, alternate methods of calculating engagement and biometrics scores may be substituted without departing from the scope hereof.

Figure 5:
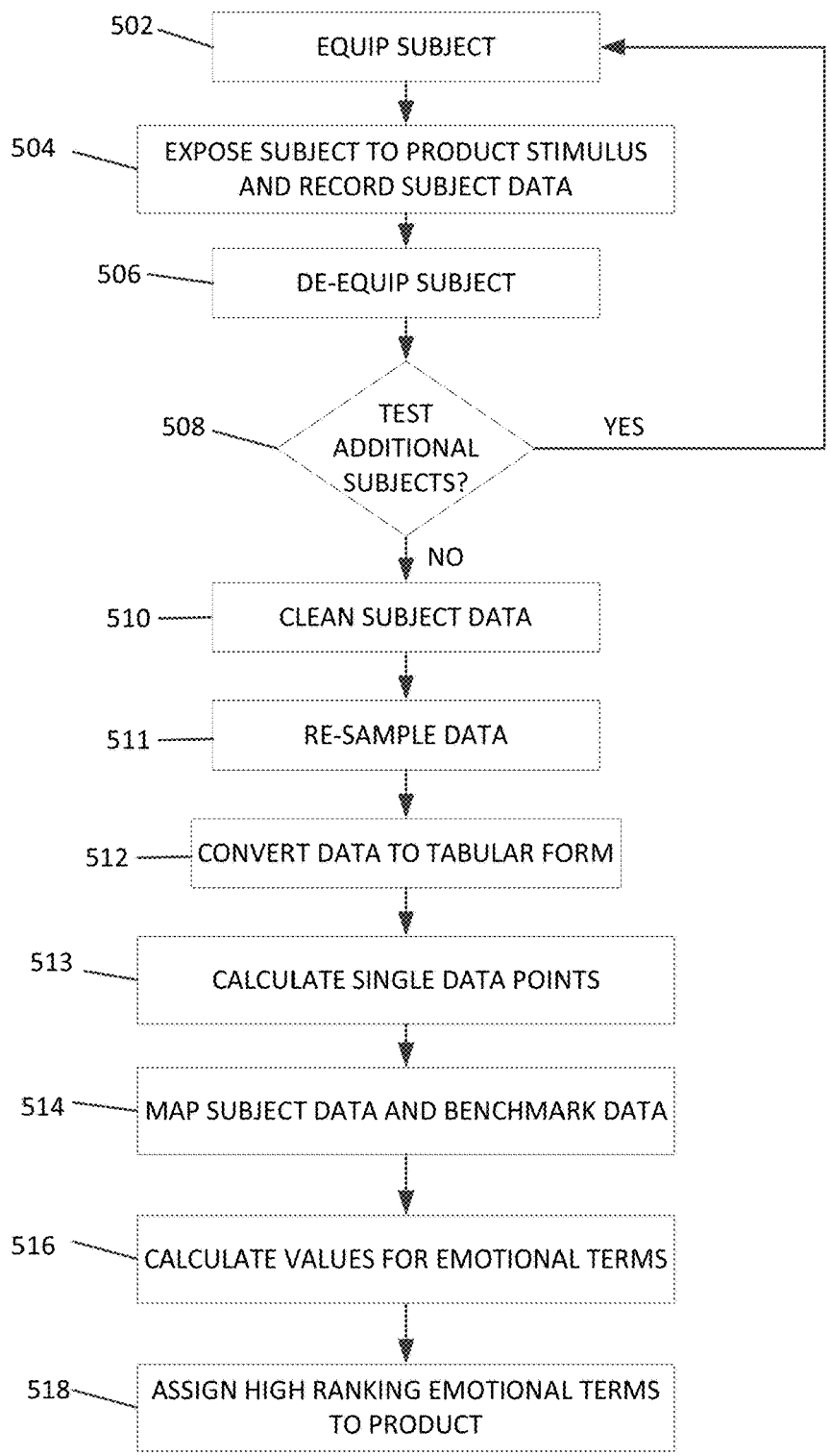
FIG. 5 depicts one method of assessing the marketability of a product in accordance with one embodiment of the present invention.

Referring now to FIG. 5, depicted is a flowchart of one method of assessing market readiness of a product in accordance with one embodiment of the invention. Assessing market readiness of a product, or consumer testing of a product, may include, inter alia, testing consumer responses to physical, virtual and concept consumer products, advertisements, communications and/or experiences. This process can include testing product attributes such as sensory (e.g., taste, touch, smell, sound, and visuals), communications, and associative descriptors. Consumer physiological responses for these attributes can be used to define, differentiate and assess current and test products for the purposes of benchmarking performance and product optimization. They can also be used to assess the emotions generated in the consumer by the product, advertisement, communication or experience.

The systems and methods of the present invention determine the need for potential product revisions by assessing whether a product meets emotional targets, which may include further assessing which aspects of the product may require revision. For example, in the case of a fragrance test, recommendations may be made as to how to adjust the fragrance to achieve an emotional goal such as joy or calm.

The systems and methods of the present invention determine or help to determine whether to proceed to market with a potential product by assessing the emotional impact of the product, or the fit of the product relative to the concept of the product. For example, in the case of holistic product testing, a positive emotional mapping location would suggest product cohesion with concept and, therefore, fitness for proceeding to market. Conversely, a negative emotional mapping location would suggest that the product is not aligned with the concept and is not ready to proceed to market.

Steps 502 through 513 of method 500 may also be utilized to determine a single data point for mapping each of one or more benchmark points on a 3D mood map such as map 700.

As depicted in FIG. 5, the method of assessing the market readiness of a product or service involves, inter alia, the following steps: 1) physiologically measuring the consumer product testing subjects while they are being exposed to the product or a product stimulus (e.g., product, advertisements, etc.); 2) processing the data measured in step 1; and 3) determining a single data point for mood comparisons and assessment. That is, in some embodiments, the product stimulus may be the actual product. In other embodiments, the product stimulus may be in the form of something that relates to the product but is not the actual product. Using the single data point or value, statistical comparisons may be made to assess product performance by comparing the new product's performance to a benchmark value. This benchmark value may include, without limitation, a benchmark value associated with a previously tested product, a competitive product, or an idealized emotional concept.

Figure 2:
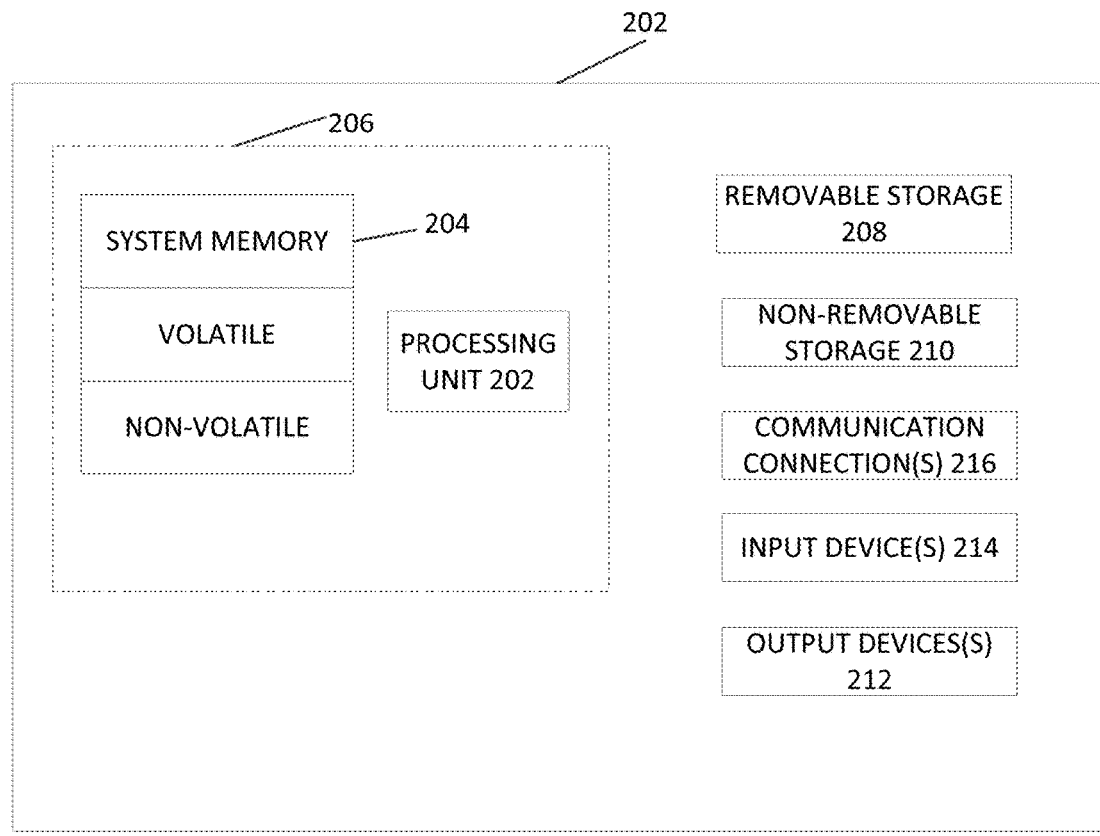
FIG. 2 depicts a block diagram of an exemplary computing device for use with the systems and methods described herein.
Figure 3:
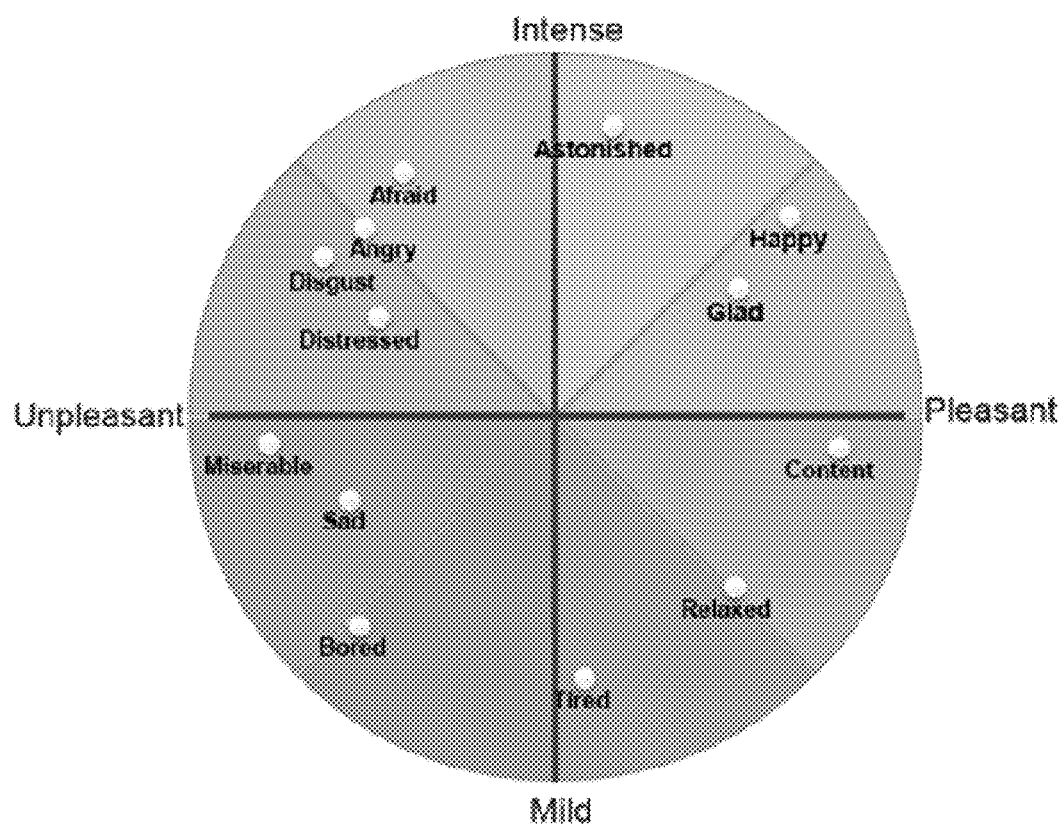
FIG. 3 depicts an exemplary two-dimensional mood map depicting arousal vs. pleasantness.

Turning now to FIG. 2, depicted is an exemplary computing device 202 for use with the systems and methods described herein. The depicted computing device is only one example of a suitable computing device and is not intended to suggest any limitation as to the scope of use or functionality. Numerous other general purpose or special purpose computing system devices, environments, or configurations may be used. Examples of well-known computing systems, environments, and/or configurations that may be suitable for use include, but are not limited to, personal computers ("PCs"), server computers, handheld or laptop devices, multi-processor systems, microprocessor-based systems, network PCs, minicomputers, mainframe computers, cell phones, tablets, embedded systems, distributed computing environments that include any of the above systems or devices, and the like.

Computer-executable instructions such as program modules executed by a computer may be used. Generally, program modules include routines, programs, objects, components, data structures, etc. which perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

In the depicted embodiment, computing device 202 includes at least one processing unit 202 and at least one memory 204. Depending on the exact configuration and type of the computing device, memory 204 may be volatile (such as random access memory ("RAM")), non-volatile (such as read-only memory ("ROM"), flash memory, etc.), or some combination of the two. This most basic configuration is illustrated in FIG. 2 by dashed lines 206. In addition to that described herein, computing devices 202 can be any web-enabled handheld device (e.g., cell phone, smart phone, or the like) or personal computer including those operating via Android™, Apple®, and/or Windows® mobile or non-mobile operating systems.

Computing device 202 may have additional features/functionality. For example, computing device 202 may include additional storage (removable and/or non-removable) including, but not limited to, magnetic or optical disks or tape, thumb drives, and external hard drives as applicable. Such additional storage is illustrated in FIG. 2 by removable storage 208 and non-removable storage 210.

Computing device 202 typically includes or is provided with a variety of computer-readable media. Computer-readable media can be any available media that can be accessed by computing device 202 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 204, removable storage 208, and non-removable storage 210 are all examples of computer storage media. Computer storage media includes, but is not limited to, RAM, ROM, electrically erasable programmable read-only memory ("EEPROM"), flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by computing device 202. Any such computer storage media may be part of computing device 202 as applicable.

Computing device 202 may also contain communications connection 216 that allows the device to communicate with other devices including. Such communications connection 216 is an example of communication media. Communication media typically embodies computer-readable instructions, data structures, program modules and/or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency ("RF"), infrared and other wireless media. The term computer-readable media as used herein includes both storage media and communication media.

Computing device 202 may also have input device(s) 214 such as keyboard, mouse, pen, voice input device, touch input device, etc. Output device(s) 212 such as a display, speakers, printer, etc. may also be included. All these devices are generally known to the relevant public and therefore need not be discussed in any detail herein except as provided.

It should be understood that the various techniques described herein may be implemented in connection with hardware or software or, as appropriate, with a combination of both. Thus, the methods and apparatus of the presently disclosed subject matter, or certain aspects or portions thereof, may take the form of program code (i.e., instructions, scripts, and the like) embodied in tangible media, such as floppy diskettes, CD-ROMs, hard drives, flash drives, DVDs or any other machine-readable storage medium wherein, when the program code is loaded into and executed by a machine, such as a computer, the machine becomes an apparatus for practicing the presently disclosed subject matter.

Additionally, input devices 214 may also include devices for monitoring, measuring, and/or recording the various measures that are utilized to create a psycho-physiological mood map as described herein including, without limitation, a data acquisition device 102 (FIG. 1) or other devices capable of receiving data from fEMG, HRV, GSR, EEG, and other behavior monitoring apparatus. Or, data from equipment capable of monitoring such measures may be transferred to a memory of computing device 202 such as memory 204, removable storage 208, or non-removable storage 210 using methods known in the art. For example, communication connections 212 may include an interface from computing device 202 to such equipment. Once data regarding the measured and monitored variables is available to computing device 202, it may run various algorithms to process such data into a mood map as described in greater detail herein. Such algorithms may optionally include a weighting algorithm.

In some embodiments of the present invention, a plurality of computing devices may be incorporated. However, it will be known to one of skill in the art that the functions of a pair of computing devices may be combined into one computing device or greater than two computing devices without departing from the scope hereof.

Turning back to FIG. 5, depicted is one exemplary process 500 for assessing the marketability of a product in accordance with one embodiment of the present invention. Process 500 begins at 502, at which a subject who has elected to be tested for the purposes of assessing the marketability of a product is equipped with sensors that will allow the subject's response(s) to the product, product stimuli, and/or benchmark stimuli to be recorded by a data acquisition device, a computing device, or the like.

An example of an exemplary system 100 for assessing the marketability of a product (and equipping a subject for such testing) in accordance with one embodiment of the present invention is depicted in FIG. 1. System 100 includes, inter alia, a data gathering system (i.e., data acquisition device 102, sensors 106, 108, 110, 112, 116, 118, and 120, and transmitters 114 and 122), computing devices 202a and 202b, and cabling 130 and 132. In the depicted embodiment, computing device 202a would be utilized by the administrator of the method to monitor the data being measured for the subject of the consumer testing. A second computing device 202b would be utilized by the subject of the consumer testing to perform functions including, but not limited to, viewing product or product stimuli and entering response data.

In the embodiment depicted in FIG. 1, the electrophysiological measures to be recorded include fEMG (for emotional valence), (2) HRV (for attention), and (3) GSR (for arousal) as discussed in greater detail above. fEMG sensors 106, 108, 110, 112, and 116, GSR sensors 120, and HRV sensors 118 may be located on the face, palm of hand, and forearm, respectively, of the subject in a manner identical or similar to that shown in FIG. 1.

In one form of the invention, these sensors are in the form of wireless disposable and/or reusable electrodes 106, 110, 112, 118, and 120 and grounds 108 and 116. For example, the fEMG sensors may be 4 millimeter ("mm") in size, snap, latex-free, vinyl, reusable electrodes used with Signa Gel such as, for example, the 4 mm EL654 Ag—AgCl reusable snap electrodes as manufactured by Biopac. In the depicted embodiment, these sensors measure electrical activity from three facial muscle groups: the corrugator supercilii muscle group (measured via electrode pair 106a and 106b); the zygomaticus major muscle group (measured via electrode pair 110a and 110b); and the orbicularis oculi muscle group (measured via electrode pair 112a and 112b)). The corrugator supercilii muscle group is associated with frowning and negative affect (i.e., negative emotional valence), whereas the zygomaticus major and orbicularis oculi muscle groups are associated with smiling and positive affect (i.e., positive emotional valence). Although the depicted embodiment of the invention includes measuring activity in three facial muscle groups, greater or lesser muscle groups could be substituted, or facial muscle groups could be omitted entirely, without departing from the scope of the present invention.

The HRV sensors 118a, 118b, and 118c, for example, may be eleven (11) mm in size, snap, latex-free, vinyl, disposable electrodes used with electrolyte gel for measuring HRV from the skin of the forearm. One exemplary electrode is the EL503 disposable electrode as manufactured by Biopac. HRV may be calculated by measuring the distance between positive R peaks of the EKG waveform (e.g., those depicted in data acquisition software such as Biopac's AcqKnowledge software) and as expressed in beats per minute (BPM). Increases in HRV are indicative of distraction or decrease in attention whereas decreases in HRV are indicative of increased attention and focus.

The GSR sensors 120a and 120b, for example, may be 16 mm in size, snap, latex-free, vinyl, disposable electrodes used with an isotonic gel for measuring electrical skin conductance (i.e., electrodermal activity) from the palm of the hand. One exemplary electrode is the EL507 disposable electrode as manufactured by Biopac. GSR is measured with a constant voltage of 0.5 V across the skin. The conductivity delta between the enter and exit electrodes is used to calculate microsiemens of conductance. These values are compared to baseline (resting state) measures to indicate changes in arousal. Changes in conductivity that are increases from baseline are indicative of increase in arousal whereas decreases in conductivity compared to baseline are indicative of decreases in arousal.

In the depicted embodiment of the present invention, the physiological data is collected from the sensors via a plurality of data transmitters that wirelessly communicate with data acquisition device 102. In one embodiment of the present invention, data acquisition device 102 is an MP150 Data Acquisition System and the sensors are BioNomadix® devices.

The data acquisition device 102 receives the data from the transmitters 114 and 122 wirelessly and communicates the data to one or more computing devices for data analysis. In the depicted embodiment, data acquisition device 102 is hardwired to two computing devices 202a and 202b via cabling 132 and 130, respectively. In this exemplary embodiment, computing device 202a is equipped with data acquisition software (e.g., AcqKnowledge software as manufactured by Biopac) and other software as described herein with reference to FIG. 5, the latter of which is utilized to convert and analyze the acquired data. The data acquisition software records data (e.g., waveforms) from a plurality of channels of the data acquisition device 102. This data may include, without limitation, EKG, EDA, facial muscle movement, and stimulus presentation signaling data. The stimulus presentation signaling data may be transmitted to the data acquisition device 102 by stimulus presentation software that may, for example, be executed by a computing device such as computing device 202b. The stimulus presentation signaling would indicate when the stimulus is presented and when such presentation ends.

In the depicted embodiment, computing device 202b is equipped with e-Prime. Cabling 132 and 130 are Ethernet cross-over and parallel port cables, respectively. Also, in the depicted embodiment, the data acquisition software is AcqKnowledge software as manufactured by Biopac, which records the data received from data acquisition device 102. The stimulus presentation software provides the subject with displays of the product stimulus and/or benchmark stimulus and triggering data relating to the onset/offset of the product and/or benchmark stimulus presentation. Although the depicted embodiment includes two (2) computing devices, more or less computing devices may be utilized without departing from the scope hereof. Further, software other than AcqKnowledge and/or e-Prime may also be substituted so long as it is able to perform the necessary functions.

In the depicted embodiment of the present invention, filter settings may be set as follows: low-pass and high-pass 500 Hz for fEMG; low-pass 3 Hz and high-pass DC for GSR; and low-pass 35 Hz and high-pass 1 Hz for HRV/EKG. Signals are recorded via the AcqKnowledge software at 1000 Hz. However, alternate settings may be substituted without departing from the scope hereof.

Referring back to FIG. 5, after the subject is equipped at step 502, for example as described above with respect to FIG. 1, method 500 proceeds to 504, at which the subject is exposed to the product and/or benchmark stimulus and subject product data (if product stimulus is being presented) or subject benchmark data (if benchmark stimulus is being presented) is recorded. That is, each subject is exposed to the product and/or benchmark stimulus for a predetermined amount of time, which may vary depending upon the type of product and/or benchmark stimulus, while the various data described herein (the "subject product data" or "subject benchmark data") are recorded (e.g., fEMG, GSR, and HRV).

When the product is a consumer good or service, for example, product stimuli may be 2D or 3D images presented via a computing device such as computing device 202b (FIG. 1). Or, for a consumer good, the product stimulus may be an actual good that is held in the subject's hand(s). When the product is an experience, the product stimulus may include placing the subject in the location of the experience. Benchmark stimulus may be virtually any item that is capable of eliciting an emotion including, without limitation, images, videos, third party products, and competitor products.

The subject's physiological measures are recorded while the subject is exposed to the product and/or benchmark stimulus, for example: while the subject views the product and/or benchmark stimuli in the form of one or more images; while the subject holds the product and/or benchmark stimulus; and/or as the subject experiences some form of product and/or benchmark stimulus in the form of stimulation (e.g., sensory stimulation, subject interaction with a service provider, subject setting, etc.). Sensory stimulation may include, but is not limited to, lighting, music, fragrance, etc. Subject setting may include, but is not limited to, features of a room the subject is within such as furniture, etc.

The data acquisition software is responsible for presenting the stimulus to the subject. Prior to the recording of data, a stimulus presentation program may be programmed including, without limitation, the stimulus to be presented, the exposure time for each stimulus, and the time lapse between presentation of multiple stimuli. In the depicted embodiment, the stimulus presentation software sends stimulus timing signals to data acquisition device 102 via cabling 130, and the data acquisition software receives the stimulus timing signals as an input from the data acquisition device 102 via cabling 132. In the depicted embodiment, in addition to presenting stimulus (e.g., images, video, websites, etc.) to the subject, the stimulus presentation software is also capable of receiving and recording answers to survey questions.

Additionally, the data acquisition software may be capable of displaying the raw data and stimulus timing information in real time as the data is measured and/or recorded. Additionally, channels may be set up to calculate values based upon the raw data (e.g., root-mean-square fEMG, heart rate data, etc.) and such values may also be displayed in real-time.

After the data is collected by the data collection software (e.g., the AcqKnowledge software referenced above), the subject is de-equipped (i.e., all sensors are removed) at 506. If, at 508, additional subjects are to be tested, process 500 returns to 502 and repeats steps 502-505. Otherwise, process 500 proceeds to 510, at which the subject product data is cleaned. For example, subject benchmark data may be tested during the same testing session as subject product data; however, different subjects may be utilized for benchmark testing and product testing. Or, the same subject may be utilized to test for both benchmark testing and product testing. Further, in some embodiments, subject benchmark data may be tested in one or more separate testing sessions from the product and save for future use.

In the depicted embodiment, data is cleaned for purposes including, but not limited to, elimination of noise. For example, for the fEMG data, raw waveforms may be normalized using normalization functions within the data acquisition software. Also, EKG data may be cleaned to eliminate noise in the EKG channel via, for example, excluding peaks associated with amplitudes that are outside the expected range. Also, for the raw fEMG and EKG data, a comb band stop function in the data acquisition software is run to remove any line frequency (i.e., 60 Hz in the USA) from the waveform.

For HRV, heart rate analysis functions may be applied to the raw EKG data utilizing the data acquisition software. For example, the data acquisition software may be used to detect heart beat peaks and to determine how many occur in a predetermined period of time to determine rate. Also, any HRV data that changes by more than 10 BPM from one second to the next is removed by doing a linear interpolation. For example, if the BPM data trends at 59, 60, 82, 62, 61, then the value 82 is nonlinear and is deemed invalid (and removed). A linear interpolation from the previous data point (60) to the following data point (62) will operate to replace the value of 82 with the value of 61.

For GSR, tonic waveforms may be normalized utilizing the data acquisition software. Also, if the raw GSR waveform is noisy, a high pass filter of 0.05 hz can be run to eliminate such noise.

Next, process 500 proceeds to 511, at which the data is re-sampled as needed. In the depicted embodiment of the invention, the data is re-sampled from 1000 Hz to 20 Hz via the averaging of every 50 ms of data.

After the data is re-sampled, method 500 proceeds to step 512. At step 512, the data is converted into a tabular format for further manipulation. An example of such tabular data is shown in table 600 of FIG. 6. Due to the large volume of data that is taken, table 600 only depicts a partial view of the data of a typical session with a subject.

Figure 6:
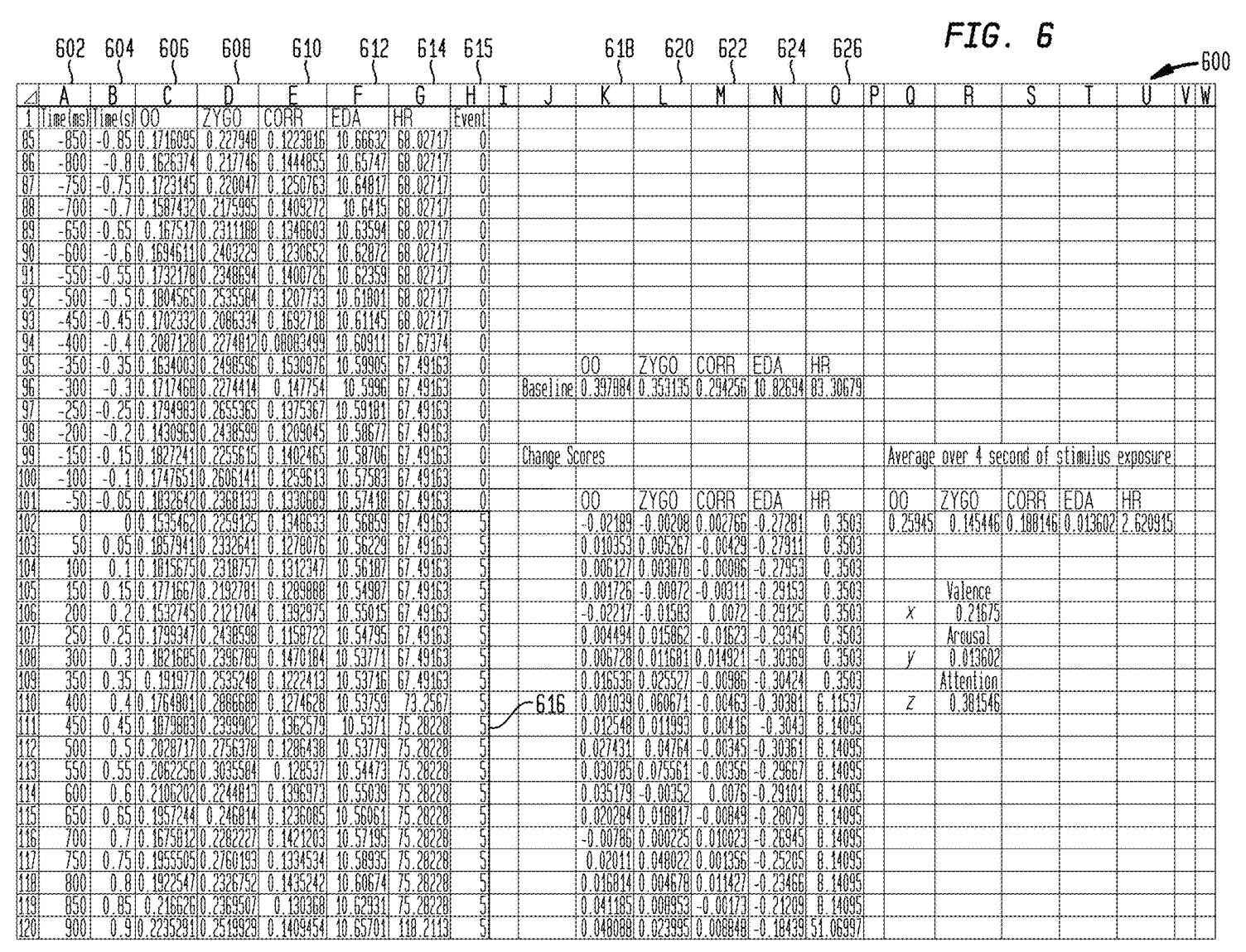

Referring now to table 600 of FIG. 6, Column 602 and 604 includes absolute time data for the data that was re-sampled at step 511 in ms and seconds, respectively. Columns 606, 608, and 610 include the re-sampled fEMG data relating to the orbicularis oculi, zygomaticus major, and corrugator supercilii muscle groups, respectively. The value shown in column 610 is raw data multiplied by negative one in order to make these values a positive number.

Columns 612 and 614 include GSR and HRV data, respectively. Column 615 includes data representing the timing of the product stimulus triggers, which may, in the exemplary example, be sent from the stimulus presentation software or similar software of computing device 202b to data acquisition device 102.

Referring back to FIG. 5, at step 513, the tabular data is then analyzed and manipulated to create a single data point. In the depicted embodiment, the data to be analyzed is the data below and to the left of the dark line 616. This data is the data that was measured during presentation of the product or product stimulus to the subject as indicated by the value of five in column 615. The five represents the value received by the e-Prime stimulus provision software in response to the sending of a stimulus trigger to the data acquisition device 102. Therefore, this value indicates that the subject was exposed to the stimulus at the time the data was measured. Alternate values and alternate stimulus provision software may be utilized without departing from the scope hereof.

To generate the single subject and/or benchmark data point, first, for each channel, the baseline is calculated by taking the average of the data measured during the five (5) seconds preceding presentation of the stimulus to the subject. For example, the baseline value for the B column data collecting during the subject's exposure to the stimulus (i.e., the data listed in column B and rows 102 and up until the point that the stimulus is removed as indicated by the presence of a zero in column G) would be calculated by summing the values in cells B2 through B101 and dividing this value by 100.

Next, change scores are calculated by subtracting the baseline from each point in the exposure data:

Change Score=Re-sampled Raw Data Value−Baseline.

A change score is calculated for each re-sampled raw data value, and the change scores for columns 606-614 are shown in columns 618-626, respectively. The baseline remains constant for all data values relating to a specific presentation of a stimulus to a subject. However, if a first stimulus is removed and a second stimulus is to be applied to the subject, a break of at least five (5) seconds will be provided to allow for the collection of new baseline data to be used in calculation of the change scores for the second stimulus presentation. For example, in a scenario in which the stimulus is provided via a computing device (e.g., computing device 202b of FIG. 1), the screen may go black while the data is collected for the second stimulus baseline. However, alternate embodiments are envisioned in which a new baseline is not calculated (i.e., the prior baseline is utilized) or a lesser amount of time separates the presentation of consecutive stimuli presentations.

In continuation of our example above, the Change Score value for the data recorded in, for example, the B102 cell would be calculated by subtracting the baseline data as calculated above from the data value in the B102 cell and this value would then be recorded in the K102 cell. This calculation would be repeated for all re-sampled raw data values that were measured during presentation of a stimulus to a subject.

The singular values that will represent each channel are then calculated by averaging the change scores associated with the four (4) second time period for the respective channel that occurred directly after presentation of the stimulus to the subject. That is, all of the change scores that are associated with the re-sampled raw data of the predetermined four (4) second time period are averaged to create a single value. In an embodiment such as the depicted embodiment in which the data is re-sampled to 20 Hz, one (1) second equals 20 rows of re-sampled raw data. Therefore, calculating the average change score for the four (4) second time period will involve summing the change scores associated with that time period (i.e., eighty change scores unless some are discarded) and dividing by the total number of change scores.

Once a single value has been calculated for each channel, the singular values that will become the x, y, and z (i.e., the fEMG, GSR, and HRV) coordinates for the Point of Interest ("POI") or benchmark point in the mood map may be calculated. That is, the single subject and benchmark data points are the points at which the POI or benchmark point, respectively, is located on the mood map. Therefore, in the depicted embodiment, these single data points are actually a set of x, y, and z coordinates.

First, the fEMG channel values are manipulated to calculate the value of the Valence data. Valence data correlates to the x-coordinate of the exemplary mood map depicted in FIG. 7 as described in greater detail herein.

The Valence data point is calculated by averaging the channel values for the zygomaticus major (the "ZYG Value")(i.e., column 608 in table 600 of FIG. 6) and orbicularis oculi (the "OO Value")(i.e., column 606 in table 600 of FIG. 6) muscle groups (i.e., the muscle groups associated with smiling and positive affect which represent positive emotional valence) to create a positive valence value.

The channel value for the corrugator supercilii muscle group (the "CORR Value")(i.e., column 610 in table 600 of FIG. 6) represents the negative valence value. The absolute Valence value is calculated as follows:

Absolute Valence value=Positive Valence−Negative Valence

For example, if the ZYG Value is 4, the 00 Value is 4, and the Corr Value is 2, the calculation is as follows:
The average of the ZYG and 00 Values is 4 (i.e., (4+4)/2)
When the Con Value is subtracted from the average value, a value of 2 is reached (i.e., 4−2). Since 2>0, the overall facial muscle group reaction is positive.

In another example, if the ZYG Value is 2, the OO Value is 2, and the Con Value is 4, the calculation is as follows:
The average of the ZYG and OO Values is 2 (i.e., (2+2)/2)
When the Con Value is subtracted from the average value, a value of −2 is reached (i.e., 2−4). Since −2<0, the overall facial muscle group reaction is negative.

This absolute valence value represents the x coordinate of the POI. This is one method of determining an absolute valence value, however, alternate methods may be substituted. Also, in some embodiments of the present invention a lesser or greater number of facial muscle groups may be measured without departing from the scope hereof and the equation may be modified accordingly. For example, if only one facial muscle group is measured or included in the data analysis, the value of the Valence value will equal the channel value for that muscle group.

The value of the Attention coordinate may be determined by the following equation:
Attention=1/x, wherein x is the value of the HRV data channel (i.e., column 614 in table 600 of FIG. 6). Attention data correlates to the z-coordinate of the exemplary mood map depicted in FIG. 7 as described in greater detail herein.

Arousal data correlates to the y-coordinate of the exemplary mood map depicted in FIG. 7 as described in greater detail herein. The arousal value is merely the value of the arousal channel (i.e., column 612 in table 600 of FIG. 6).

After the single subject and/or benchmark data points have been calculated at step 513, method 500 proceeds to 514, at which the single subject data points and single benchmark data points are mapped. In the exemplary depicted embodiment, the single subject data point is mapped onto map 700 as shown in FIG. 7 by mapping the POI 702 for the particular stimulus presentation on the map in accordance with its x, y, and z coordinates as calculated using methods as described herein. That is, the POI is mapped in accordance with the values calculated in step 513. The POI value is the biometric data point that represents the subject's response to the product and/or product stimuli. This mapping is described in further detail herein with regards to FIG. 8B.

Similarly, in the exemplary depicted embodiment, the single benchmark data points for each of the benchmark stimuli are mapped onto map 700 as shown in FIG. 7 by mapping the point for the particular benchmark stimulus on the map in accordance with its x, y, and z coordinates as calculated using methods as described herein. That is, the point is mapped in accordance with the values calculated in step 513. This mapping is described in further detail herein with regards to FIG. 8B.

In the depicted embodiment, the method includes mapping twenty biometric single benchmark data points 704 onto the mood map, namely, interested, distressed, excited, upset, strong, guilty, scared, hostile, enthusiastic, proud, irritable, alert, ashamed, inspired, nervous, determined, attentive, jittery, active, and afraid. These twenty points are taken from the Positive and Negative Affect Schedule ("PANAS") developed by Watson, Clark, and Tellegen (1988b). The POI 702 is compared to the benchmark points 704 in order to determine the most applicable emotional terms to be assigned to the product being tested.

The location of the benchmark data points 704 in map 700 may be determined as described above or using alternate methods without departing from the scope hereof. In the depicted embodiment, the benchmark data points were tested via a survey having a plurality of respondents. In one embodiment, one hundred and twenty-six (126) respondents participated in the survey. Each of the respondents was shown twenty (20) benchmark stimuli. In the depicted embodiment, these benchmark stimuli were in the form of images were taken from GAPED, however, alternate benchmark stimuli could be substituted without departing from the scope hereof. The twenty (20) benchmark stimuli are selected with enough variety that the set of images encompasses the majority of the twenty (20) designated emotional terms.

The GAPED benchmark points have been previously measured via psychometrics for their valence and arousal values. In the depicted embodiment, to obtain each benchmark's location on the 3D mood map such as map 700, the survey respondents are equipped in the same manner as the subjects of the product testing as described herein with respect to FIGS. 1 and 5 and x, y, z coordinates are calculated for the plotting of benchmark points in the same manner as they are calculated for the plotting of the POI. That is, in order to calculate the location of a benchmark point on a mood map such as mood map 700, steps 502 through 513 are executed as described herein for the POI to determine the benchmark point's x, y, and z coordinates as described above. In this manner, benchmark data points 704 and POI 702 are derived in the same manner except that the benchmark point, through the survey data, has connection to emotional terms.

The respondents were then asked to select an emotional term from the list of twenty (20) emotional terms set forth above to describe the benchmark stimulus shown to the respondent. The percentage of respondents that chose the same emotional term for the benchmark stimulus was tallied and utilized as a weighting value. For example, if sixty three (63) of the one hundred and twenty six (126) people picked "Interested" to describe a particular benchmark stimulus, the emotional term of Interested was assigned a weighting value of fifty (50) percent or 0.5. When determining the distance from a POI to the benchmark point, the weight is used as a multiplier (as described in greater detail herein) to modify the strength of association with the emotional term. That is, the survey provides emotional labeling for these points and their relative strength of association.

For example, a benchmark stimulus may include an image of a baby which has a highest ranked emotional term of "enthusiastic" because 19% of the survey respondents choose this emotional term from the list of twenty (20) possible emotional terms. Such an emotional term would be assigned a weight of 0.19. Also, when the survey respondent was tested via a system such as that shown in FIG. 1 and the coordinates of the benchmark point were determined using steps similar to those of 502-514 of method 500 as shown in FIG. 5, this stimulus is also associated with positive arousal.

Each of the twenty (20) benchmark stimuli has a percentage weighting for each of the twenty (20) emotional terms, thereby providing four hundred (400) weighting values to be used to modify the distance calculation between the benchmark points and the POI(s). There are no exact mood map locations for the emotional terms, but the closer a POI is to a benchmark point with a high association with a term, the more that emotional term will be designated to apply to the POI. In the depicted embodiment, top value emotional term(s) may be used to describe a product.

Once all single benchmark data points and the single subject data point ("POI") have been mapped, method 500 proceeds to 516, at which values are calculated for all of the emotional terms. For simplification, we will show the data analysis relative to five (5) benchmark points only, but the analysis is performed for all twenty (20) benchmark points of the depicted embodiment. The value of the emotional terms is determined by first calculating the distance (a-e) (706a-706e) from the POI to each benchmark point (A-E) (704a-704e). Each benchmark point has twenty (20) ranked percentage values for each emotional term, as determined from a separately conducted random survey. An example weighting is shown below for the five exemplary emotional terms:

|        | A   | B   | C   | D   | E   |
|--------|-----|-----|-----|-----|-----|
| Term 1 | 40% | 10% | 20% | 10% | 10% |
| Term 2 | 20% | 50% | 20% | 10% | 20% |
| Term 3 | 20% | 10% | 20% | 10% | 40% |
| Term 4 | 10% | 20% | 10% | 60% | 20% |
| Term 5 | 10% | 10% | 30% | 10% | 10% |

| Distance: POI to Benchmark: | a / A | b / B | c / C | d / D | e / E |
|---|---|---|---|---|---|
| Term 1 | 0.4 | 0.1 | 0.2 | 0.1 | 0.1 |
| Term 2 | 0.2 | 0.5 | 0.2 | 0.1 | 0.2 |
| Term 3 | 0.2 | 0.1 | 0.2 | 0.1 | 0.4 |
| Term 4 | 0.1 | 0.2 | 0.1 | 0.6 | 0.2 |
| Term 5 | 0.1 | 0.1 | 0.3 | 0.1 | 0.1 |

Distance from the POI to the benchmark points can then be weighted by the percentages shown above thereby providing the following calculations:

$$POI(\text{Term 1: Nervous}) = 0.4*a + 0.1*b + 0.2*c + 0.1*d + 0.1*e$$

$$POI(\text{Term 2: Enthusiastic}) = 0.2*a + 0.5*b + 0.2*c + 0.1*d + 0.2*e$$

$$POI(\text{Term 3: Interested}) = 0.2*a + 0.1*b + 0.2*c + 0.1*d + 0.4*e$$

$$POI(\text{Term 4: Active}) = 0.1*a + 0.2*b + 0.1*c + 0.6*d + 0.2*e$$

$$POI(\text{Term 5: Afraid}) = 0.1*a + 0.1*b + 0.3*c + 0.1*d + 0.1*e$$

The relative applicability of each term for the POI can now be determined in the form of an emotional term value to figure out which emotional term stands out as the most relevant term.

POI (Nervous)=9
POI (Enthusiastic)=12
POI (Interested)=10
POI (Active)=12
POI (Afraid)=7

In this case, emotional terms 2 and 4 have the highest ranking emotional term values, therefore, the emotional terms "Enthusiast" and "Active" are most applicable to the POI. The POI associated with the subject's data for that particular product stimulus has now been assigned categorical emotional values based on biometric data alone.

Although the depicted embodiment depicts the mapping of data in comparison to subject benchmark data, alternate embodiments are envisioned in which the data is analyzed stand-alone, in comparison to additional test samples, and/or in comparison to competitor products.

Although exemplary embodiments may refer to utilizing aspects of the presently disclosed subject matter in the context of one or more stand-alone computer systems, the subject matter is not so limited, but rather may be implemented in connection with a multi-computer computing environment. Still further, aspects of the presently disclosed subject matter may be implemented in or across a plurality of processing chips or devices, and storage may similarly be affected across a plurality of computing devices 202. Such devices might include personal computers, network servers, and handheld devices (e.g., cell phones, tablets, smartphones, etc.), for example.

Although several processes have been disclosed herein as software, it may be appreciated by one of skill in the art that the same processes, functions, etc. may be performed via hardware or a combination of hardware and software. Similarly, although the present invention has been depicted as a hardwired system, these concepts may be applied to wireless systems and hybrid hardwired and wireless systems without departing from the scope of the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A system for assessing the marketability of a product comprising:
   at least one data gathering system for sensing subject product data and subject benchmark data, at least a portion of the at least one data gathering system equipped to a subject;
   a computing device having a processing unit for receiving the subject product data and the subject benchmark data from said at least one data gathering system, the processing unit operatively coupled to a non-transitory computer readable medium, comprising instructions stored thereon, which, when executed by the processing unit, perform the steps of:
   presenting a product stimulus and at least one benchmark stimulus to the at least one subject;
   recording the subject product data and the subject benchmark data;
   manipulating the subject product data to create a single subject product data point representing a first location of the product stimulus on a 3D mood map;
   manipulating the subject benchmark data to create at least one subject benchmark data point, each of the at least one subject benchmark data point associated with one of the at least one benchmark stimulus, the at least one single subject benchmark data point representing a second location of a respective one of the at least one benchmark stimulus on the 3D mood map;
   calculating at least one emotional term value based upon said single subject product data point and the at least one subject benchmark data point; and
   assigning an emotional term to the product based upon the at least one emotional term value.

2. A method for assessing the marketability of a product comprising the steps of: equipping at least one subject with at least a portion of a data gathering system
   for gathering subject product data and subject benchmark data;
   exposing the at least one subject to a product stimulus and at least one benchmark stimulus;
   recording the subject product data and the subject benchmark data;
   manipulating the subject product data to create a single subject product data point representing a first location of the product stimulus on a 3D mood map;
   manipulating the subject benchmark data to create at least one subject benchmark data point, each of the at least one subject benchmark data point associated with one of the at least one benchmark stimulus, the at least one subject benchmark data point representing a second location of a respective one of the at least one benchmark stimulus on the 3D mood map;
   calculating at least one emotional term value based upon said single subject product data point and the at least one subject benchmark data point; and
   assigning an emotional term to the product based upon the at least one emotional term value.

3. A method according to claim 2 further comprising:
   mapping said single subject product data point on the 3D mood map; and
   mapping the at least one subject benchmark data point on the 3D mood map.

4. A method according to claim 2, wherein said calculating the at least one emotional term value includes weighting one or more of the at least one subject benchmark data point.

5. The system of claim 1, wherein the data gathering system includes one or more sensors, each of the one or more sensors for measuring a psycho-physiological measure.

6. The system of claim 5, wherein the psycho-physiological measure includes at least one of the group consisting of facial electromyography, heart rate variability, galvanic skin response, electroencephalogram, eye tracking, behavioral analysis, and combinations thereof.

7. The system of claim 6, wherein the facial electromyography measure measures electrical activity from at least one facial muscle group selected from the group consisting of a corrugator supercilia muscle group, a zygomaticus major muscle group, a orbicularis oculi muscle group, and combinations thereof.

8. The method of claim 2, wherein the subject product data and the subject benchmark data include one or more psycho-physiological measures.

9. The method of claim 8, wherein the psycho-physiological measures include at least one of the group consisting of facial electromyography, heart rate variability, galvanic skin response, electroencephalogram, eye tracking, behavioral analysis, and combinations thereof.

* * * * *